United States Patent
Kroon

(10) Patent No.: US 9,485,487 B2
(45) Date of Patent: Nov. 1, 2016

(54) METHOD AND APPARATUS FOR GENERATING A SIGNAL FOR A DISPLAY

(75) Inventor: Bart Kroon, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 260 days.

(21) Appl. No.: 14/126,228

(22) PCT Filed: Jun. 18, 2012

(86) PCT No.: PCT/IB2012/053060
§ 371 (c)(1),
(2), (4) Date: Dec. 13, 2013

(87) PCT Pub. No.: WO2012/176109
PCT Pub. Date: Dec. 27, 2012

(65) Prior Publication Data
US 2014/0118509 A1    May 1, 2014

(30) Foreign Application Priority Data
Jun. 22, 2011   (EP) ..................... 11170866

(51) Int. Cl.
H04N 13/00    (2006.01)
H04N 13/04    (2006.01)

(52) U.S. Cl.
CPC ...... *H04N 13/0011* (2013.01); *H04N 13/0014* (2013.01); *H04N 13/0477* (2013.01)

(58) Field of Classification Search
CPC .................................. H04N 13/0014
USPC .......................................... 348/46
See application file for complete search history.

(56) References Cited

U.S. PATENT DOCUMENTS

| | | | |
|---|---|---|---|
| 5,574,836 A | 11/1996 | Broemmelsiek | |
| 6,101,222 A * | 8/2000 | Dorricott | G11B 27/28 348/700 |

(Continued)

FOREIGN PATENT DOCUMENTS

| | | |
|---|---|---|
| EP | 2293584 A1 | 3/2011 |
| EP | 2605521 A1 | 6/2013 |

(Continued)

OTHER PUBLICATIONS

Smeaton, Alan F. et al "Video Shot Boundary Detection: Seven Years of TREDVid Activity", Computer Vision and Understanding, vol. 114, 2010, pp. 411-418.

(Continued)

*Primary Examiner* — Jeffery Williams

(57) ABSTRACT

An apparatus for generating an image signal for a display (103) comprises a receiver (105) which receives a video signal comprising three-dimensional data for a sequence of images. An image generator (107) generates display images for the sequence of images based on the three dimensional data and a rendering viewpoint. A shot transition detector (111) detects shot transitions in the sequence of images and a viewpoint controller (113) changes the rendering viewpoint in synchronization with the shot transition. A signal generator (109) generates the image signal to comprise the display images. The apparatus may further track viewer movements and adapt the rendering accordingly. In addition the system may bias the viewpoint towards a nominal viewpoint. The viewpoint changes due to tracking may be non-synchronous whereas the viewpoint changes due to bias may be synchronous with shot transitions.

20 Claims, 11 Drawing Sheets

(56) References Cited

U.S. PATENT DOCUMENTS

| | | |
|---|---|---|
| 6,304,286 B1 | 10/2001 | Shirai |
| 8,698,877 B2 | 4/2014 | Tadokoro et al. |
| 2007/0211149 A1 | 9/2007 | Burtnyk |
| 2010/0053310 A1* | 3/2010 | Maxson ............ H04N 13/0011 348/51 |

FOREIGN PATENT DOCUMENTS

| | | |
|---|---|---|
| WO | 9723097 A2 | 6/1997 |
| WO | 2004075537 A1 | 9/2004 |
| WO | 2005031652 A1 | 4/2005 |
| WO | 2009095862 A1 | 8/2009 |
| WO | 2010025458 A1 | 3/2010 |

OTHER PUBLICATIONS

Lee, Johnny Chung "Hacking the Nintendo WII Remote", Pervasive Computing, vol. 7, 2008 IEEE, pp. 39-45.

La Cascia, Marco et al "Fast, Reliable Head Tracking under Varying Illumination: An Approach based on Registration of Texture-Mapped 3D Models", IEEE Transactions on Pattern Analysis and Machine Intelligence, vol. 22, No. 4, Apr. 2000, pp. 322-336.

Morimoto, Carlos et al "Pupil Detection and Tracking using Multiple Light Sources", Journal of Image and Vision Computing, vol. 18, No. 4, 2000, pp. 331-335.

* cited by examiner

METHOD AND APPARATUS FOR GENERATING A SIGNAL FOR A DISPLAY

CROSS-REFERENCE TO PRIOR APPLICATIONS

This application is the U.S. National Phase application under 35 U.S.C. §371 of International Application No. PCT/IB2012/053060, filed on Jun. 18, 2012, which claims the benefit of European Patent Application No. 11170866.5, filed on Jun. 22, 2011. These applications are hereby incorporated by reference herein.

FIELD OF THE INVENTION

The invention relates to a generation of a signal for a display, and in particular, but not exclusively, to rendering of three dimensional image information in dependence on a viewpoint of a viewer.

BACKGROUND OF THE INVENTION

In recent years the increasing interest in providing a three dimensional (3D) perception of images and video content has led to the introduction of 3D displays that can provide a 3D effect by providing different views to the two eyes of a viewer. Such displays include time sequential stereoscopic displays which project images to the right and left eyes in a time sequential fashion. The viewer wears glasses comprising LCD elements that alternatively block the light to the left and right eye thereby ensuring that each eye sees only the image for that eye. Another type of display is an autostereoscopic display which does not require the viewer to wear glasses. Such a display typically renders a relatively large number of images in different view cones. For example, typically autostereoscopic displays may implement nine different view cones each of which corresponds to a different set of viewpoints. Such displays thus present nine different images simultaneously.

As another example, a 3D effect may be achieved from a conventional two-dimensional display implementing motion parallax function. Such displays track the movement of the user and adapt the presented image accordingly. In a 3D environment, the movement of a viewer's head results in a relative perspective movement of close objects by a relatively large amount whereas objects further back will move progressively less, and indeed objects at an infinite depth will not move. Therefore, by providing a relative movement of different image objects on the two dimensional display based on the viewer's head movement a perceptible 3D effect can be achieved.

In order to fulfill the desire for 3D image effects, content is created to include data that describes 3D aspects of the captured scene. For example, for computer generated graphics, a three dimensional model can be developed and used to calculate the image from a given viewing position. Such an approach is for example frequently used for computer games which provide a three dimensional effect.

As another example, video content, such as films or television programs, are increasingly generated to include some 3D information. Such information can be captured using dedicated 3D cameras that capture two simultaneous images from slightly offset camera positions. In some cases, more simultaneous images may be captured from further offset positions. For example, nine cameras offset relative to each other could be used to generate images corresponding to the nine viewpoints of a nine view cone autostereoscopic display.

However, a significant problem is that the additional information results in substantially increased amounts of data, which is impractical for the distribution, communication, processing and storage of the video data. Accordingly, the efficient encoding of 3D information is critical. Therefore, efficient 3D image and video encoding formats have been developed which may reduce the required data rate substantially.

One such encoding format encodes a left eye image and a right eye image for a given viewer position. The coding efficiency may be increased by encoding the two images relative to each other. E.g. inter-image prediction may be used or one image may simply be encoded as the difference to the other image.

Another encoding format provides one or two images together with depth information that indicates a depth of the relative image objects. This encoding may further be supplemented by occlusion information that provides information of image objects which are occluded by other image elements further in the foreground.

The encoding formats allow a high quality rendering of the directly encoded images, i.e. they allow high quality rendering of images corresponding to the viewpoint for which the image data is encoded. The encoding format furthermore allows an image processing unit to generate images for viewpoints that are displaced relative to the viewpoint of the captured images. Similarly, image objects may be shifted in the image (or images) based on depth information provided with the image data. Further, areas not represented by the image may be filled in using occlusion information if such information is available.

Thus, based on the received data, an image processing unit may generate images for other viewpoints. For example, an image processing unit may generate views to represent motion parallax when a user moves his head, or may generate views for all nine viewpoints of a nine-view cone autostereoscopic image. Such processing allows images to be generated which may enable the viewer to e.g. "look around" objects.

However, a problem is that images for other viewpoints than the viewpoint of the originally encoded images typically have degraded quality relative to the originally encoded images, i.e. relative to the images that were generated for the original camera position. For example, the relative offset of image objects may only be approximately correct, or occlusion information may simply not be available for image objects that are de-occluded as a consequence of the change of viewpoint. In fact, it has been found that the perceived quality degradation increases non-linearly with the displacement of the viewpoint. Thus, a doubling of the viewpoint offset is typically perceived to result in substantially more than a doubling of the quality degradation.

Hence, an improved approach would be advantageous and in particular an approach allowing increased flexibility, increased perceived image quality, an improved spatial experience, improved viewpoint adaptation, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for generating a signal for a display, the apparatus comprising: a receiver for receiving a video signal comprising three-dimensional data for a sequence of images; an image generator for generating display images for the sequence of images based on the three dimensional data and a rendering viewpoint; a shot transition detector for detecting shot transitions in the sequence of images; a viewpoint controller for changing the rendering viewpoint in synchronization with the shot transitions; and a signal generator for generating the signal to comprise the display images.

The invention may provide an improved viewing experience and in particular improved average image quality may be perceived in many scenarios. The invention may allow a more natural user experience for a user watching 3D image content. The approach may allow changes in the viewpoint for the presented image to be less noticeable to the user thereby allowing improved freedom and flexibility in changing of the viewpoint by the system.

The three-dimensional data may be provided in any suitable format, such as for example a plurality of images corresponding to different viewing angles, one or more images combined with depth information, or e.g. a combination of these approaches.

In accordance with an optional feature of the invention, the apparatus further comprises: an input for receiving a position indication for a position of a viewer of the display; a processor for determining a viewer viewpoint estimate in response to the position indication; and wherein the viewpoint controller is arranged to determine the rendering viewpoint in response to the viewer viewpoint estimate.

An improved user experience may be achieved. For example, the user may perceive a realistic and natural motion parallax when moving his head while at the same time allowing the system to adapt to a new semi-static position. The adaptation may allow a change in the viewpoint of the user relative to the scene with this change being less noticeable by the user. The approach may provide an improved trade-off between the desire to dynamically adapt the presented image to viewer head movements, and the desire to render images corresponding to a preferred viewpoint.

The position indication may be an indication of a three-dimensional, two-dimensional or even one dimensional position characteristic for the user. For example, the position indication may be indicative of an angle from the display to the viewer viewpoint or a position along a horizontal axis parallel to the display.

In accordance with an optional feature of the invention, the viewpoint controller is arranged to adjust the rendering viewpoint to track changes in the viewer viewpoint estimate non-synchronously to the shot transitions.

This allows for a smooth and naturally seeming adaptation of the image to user movement while also allowing the system to introduce other changes to the rendering viewpoint with reduced noticeability for the user. The approach may specifically allow a natural experience of motion parallax being generated thereby providing strong 3D cues.

In accordance with an optional feature of the invention, the biasing of the rendering viewpoint towards the nominal viewpoint is dependent on at least one of: a difference between the rendering viewpoint and a nominal viewpoint; a difference between the viewer viewpoint estimate and a nominal viewpoint; a content characteristic for the sequence of images; a depth characteristic for the sequence of images; a short transition frequency estimation; a shot duration; and a quality degradation indication for the rendering viewpoint.

This may allow improved performance and/or may allow an improved user experience.

In accordance with an optional feature of the invention, the viewpoint controller is arranged to introduce a step change to the rendering viewpoint in connection with a shot-transition.

This may allow an improved user experience and may e.g. reduce the noticeability and/or speed of the change in viewpoint. The viewpoint controller may further be arranged to perform a continuous and smooth adaptation of the rendering viewpoint to viewer movement in time intervals between shot transitions.

In accordance with an optional feature of the invention, the viewpoint controller is arranged to bias the rendering viewpoint towards a nominal viewpoint by changing the rendering viewpoint towards the nominal viewpoint in synchronization with the shot transitions.

This may allow an improved quality of the rendered image while at the same time allowing the system to follow dynamic changes in the viewer's head position. Typically, the image quality is higher for a viewpoint that corresponds to a nominal viewpoint. The nominal viewpoint may for example correspond to an authored viewpoint, such as the viewpoint for which the 3D data is provided. When deviating from this nominal viewpoint, the generation of images typically introduces some image degradation and artifacts. When the viewer changes position the viewer's viewpoint also changes. By adapting the rendering such that the rendering viewpoint follows the viewer viewpoint, a very realistic 3D experience can be provided including e.g. motion parallax and allowing the viewer to "look around" objects. However, the change in viewpoint may typically result in some image degradation. The system may accordingly bias the rendering viewpoint from the viewer viewpoint towards the nominal viewpoint in order to increase the image quality for the presented images. Furthermore, this change in viewpoints is synchronized with the shot transitions which results in the viewpoint changes being much less perceptible to the user. Thus, an improved image quality is achieved while still allowing a natural response to user movements.

In some embodiments, the biasing may be introduced only when a variation characteristic of the position indication meets a criterion. For example, when the user head movement is less than a given amount in a given time interval, the bias may be introduced. However, if user movement above a given level is detected in this example, no bias is introduced and the rendering viewpoint follows the viewer viewpoint.

The biasing may be a predetermined biasing. For example, a given predetermined change of the rendering viewpoint towards the nominal viewpoint may be introduced.

The nominal viewpoint may be a nominal viewpoint relative to the display, such as a position symmetrically directly in front of the display and a given predetermined height. The nominal viewpoint may specifically correspond to a central viewing position for the display. The nominal viewpoint may correspond to the authoring viewpoint for the received video signal, such as e.g. the camera viewpoint when capturing or generating the images of the video signal.

In accordance with an optional feature of the invention, the display is a monoscopic display.

The invention may allow an improved user experience for a user watching 3D content on a monoscopic display. In particular, the approach may allow a 3D effect through the implementation of a motion parallax adaptation of the rendered image while at the same time allowing the system to (at least partially) imperceptibly reverse to an increased quality image.

The signal generation may be arranged to generate the drive signal to comprise monoscopic images. The display images may be monoscopic images.

In accordance with an optional feature of the invention, the display is a stereoscopic display.

The invention may allow an improved user experience for a user watching 3D content on a stereoscopic display. In particular, the approach may allow a 3D effect through the stereoscopic rendering of different images for the left and right eyes as well as optionally the implementation of a motion parallax adaptation of the rendered images. The approach may allow viewpoint changes to be of reduced perceptibility and may in particular allow a less noticeable reversal to a preferred viewpoint for the presented stereoscopic images.

The signal generation may be arranged to generate the drive signal to comprise stereoscopic images. The display images may be stereoscopic images.

The stereoscopic display may specifically be an autostereoscopic display.

In accordance with an optional feature of the invention, the apparatus further comprises a shot cut generator arranged to introduce a shot cut to the sequence of images.

This may provide an improved user experience in many scenarios. For example, it may reduce the perceptibility in changes in the viewpoint even when the presented content does not contain very frequent shot transitions. The system may specifically adapt the rendering viewpoint changes to correspond to the shot transitions in the sequence of images, and to introduce additional shot transitions to the sequence of images if it does not allow such an adaptation to provide a suitable change of rendering viewpoint.

In accordance with an optional feature of the invention, the shot cut generator is arranged to introduce the short cut in response to at least one of: a shot duration characteristic meeting a criterion; the rendering viewpoint meeting a criterion; a quality degradation indication meeting a criterion; and a detection of a viewer crossing a viewing cone boundary for an autostereoscopic display.

This may provide an improved user experience in many scenarios and for many different video signals and video content.

In accordance with an optional feature of the invention, the viewpoint controller is arranged to switch to a second mode of operation in response to a criterion being met, the viewpoint controller when in the second mode of operation being arranged to bias the rendering viewpoint towards a nominal viewpoint for the display by changing the rendering viewpoint towards the nominal viewpoint non-synchronously with the shot transitions.

This may allow an improved suitability for an increased range of video content. For example, if the characteristics of the specific sequence of images do not allow a suitable change of rendering viewpoint, a different mode may be used in which the rendering viewpoint changes are not synchronized to shot transitions. For example, a slow continuous change of rendering viewpoint may be used corresponding to the viewer seeing a slow rotation of the image towards the view corresponding to the nominal viewpoint.

The biasing may in the second mode of operation be slower than for the shot transition synchronized mode.

In accordance with an optional feature of the invention, the viewpoint controller is arranged to limit the rendering viewpoint relative to a nominal viewpoint.

This may provide improved image rendering in many scenarios and may specifically be used to ensure a desired trade-off between image quality and viewpoint change characteristics.

According to an aspect of the invention there is provided a method of generating a signal for a display, the method comprising: receiving a video signal comprising three-dimensional data for a sequence of images; generating display images for the sequence of images based on the three dimensional data and a rendering viewpoint; detecting shot transitions in the sequence of images; changing the rendering viewpoint in synchronization with the shot transitions; and generating the signal to comprise the display images.

According to an aspect of the invention there is provided a computer program product comprising computer program code means adapted to perform all the steps of the method when said program is run on a computer.

According to an aspect of the invention there is provided a display comprising: a receiver for receiving a video signal comprising three-dimensional data for a sequence of images; an image generator for generating display images for the sequence of images based on the three dimensional data and a rendering viewpoint; a shot transition detector for detecting shot transitions in the sequence of images; a viewpoint controller for changing the rendering viewpoint in synchronization with the shot transitions; a display panel; and a display driver for driving the display panel to render the display images.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a display system seeking to maintain a correct perspective for a viewer of a three dimensional scene presented on a display. However, it will be appreciated that the invention is not limited to this application but may equally be applied to e.g. applications seeking to introduce or maintain an artistic, distorted or artificial perspective.

Figure 1:
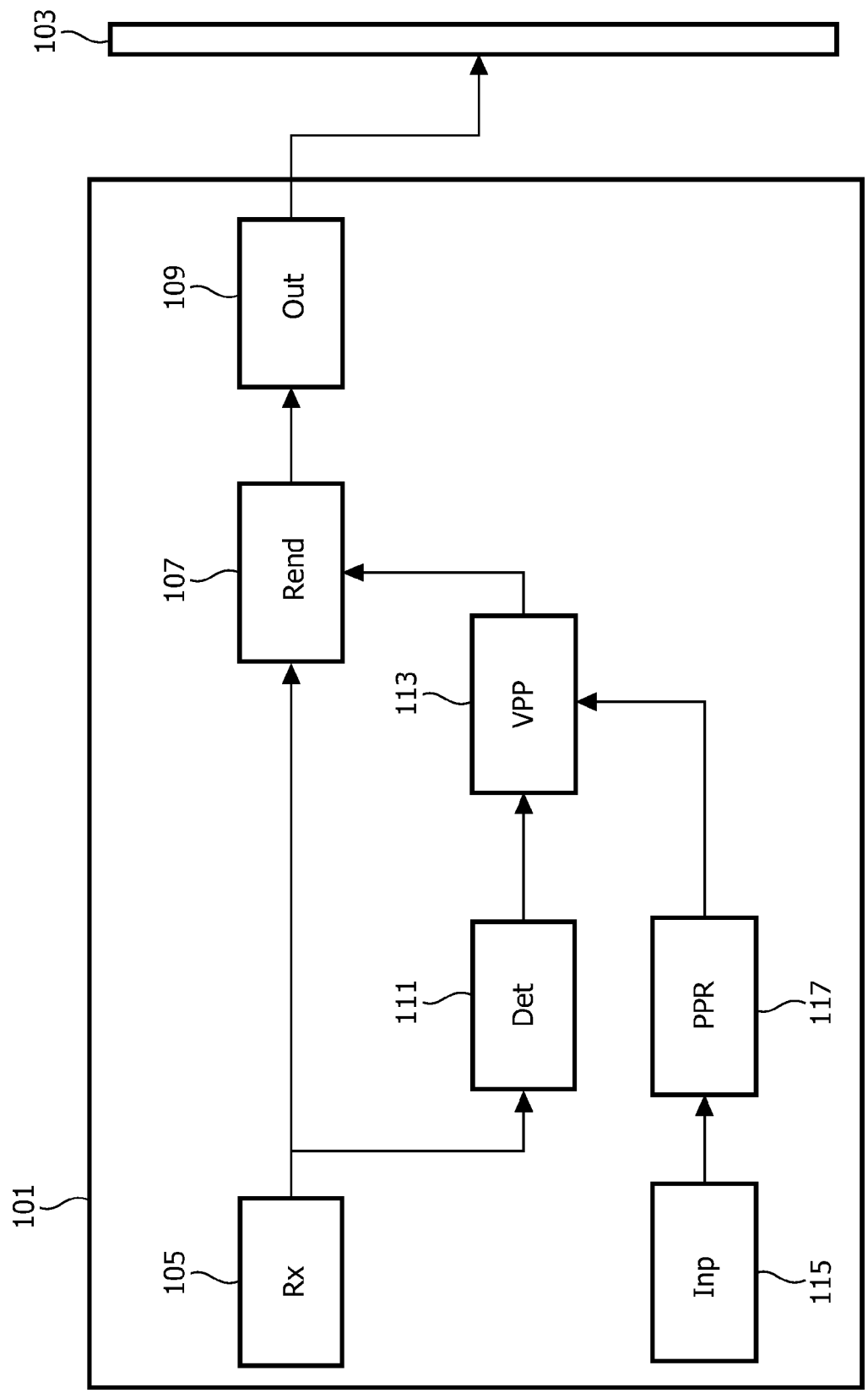
FIG. 1 illustrates examples of a display system in accordance with some embodiments of the invention.

FIG. 1 illustrates a display system in accordance with some embodiments of the invention. The system comprises an image processing unit 101 which is coupled to a display 103. In some embodiments, the image processing unit 101 and the display 103 may be separate entities and e.g. the image processing unit 101 may be, or be part of, a separate set-top box (such as e.g. a personal video recorder, a home cinema amplifier, etc.) and the display 103 may be a separate entity such as e.g. a television, video monitor, or computer display. In such embodiments, the image processing unit 101 and the display 103 may be coupled together via any suitable communication medium including for example a direct cable, a direct wireless connection, or a communication network such as e.g. a Wi-Fi based network.

In other embodiments, the image processing unit 101 may be part of a display, and indeed the image processing unit 101 may comprise functionality for generating drive signals directly for a display panel, such as e.g. an LCD or plasma display panel.

The image processing unit 101 comprises a receiver 105 which receives a video signal. The video signal comprises three-dimensional (3D) data for a sequence of images. The 3D data thus enables 3D images to be generated by suitable processing of the 3D data.

In some embodiments, the 3D data may simply comprise a plurality of (typically simultaneous) images that correspond to different viewpoints of the same scene. For example, an image may be provided for a left eye view and a corresponding image may be provided for a right eye view. The two images thus represent the same scene from different viewpoints and provide a stereoscopic 3D representation of the scene. In other embodiments, more than two corresponding images may be provided.

As another example, the 3D data may be provided as image data together with depth data. For example, a single image may be provided together with data indicating a corresponding depth of different image areas and objects (or indeed of individual pixels). The depth data may for example be given as a disparity or a z-component. Furthermore, occlusion image data may be provided representing image information for image objects that are fully or partially occluded by other image areas.

The receiver 105 may receive the video signal from any suitable internal or external source. For example, the video signal may be received from an external communication or distribution network, directly from a suitable source such as an external Bluray™ player, a personal video recorder etc., or from an internal source such as an internal optical disc reader, a hard disk or indeed a local image generator, such as a graphical model implemented by a suitable processing platform.

The receiver 105 is coupled to an image generator 107 which is arranged to generate display images for the input sequence of images based on the 3D data and a rendering viewpoint. The image generator 107 is arranged to generate images that can be presented by a display and which correspond to a given rendering viewpoint for the scene. Thus the display images are generated to represent the view that would be seen from a viewer/camera positioned at the rendering viewpoint. The rendering viewpoint may differ from the content or authoring viewpoint for which the input sequence of images is generated or referred.

For example, the input signal comprises a sequence of images generated for a given authoring viewpoint. The authoring viewpoint may be the viewpoint for an actual camera recording the images or may e.g. be a virtual camera viewpoint used by a graphical model. In addition to the image data for these images, the 3D data may further comprise depth information, e.g. in the form of disparity data. The image generator 107 may then process the images using the depth data to generate images reflecting how the scene would be seen from a different viewpoint. Thus, the image generator 107 generates display images that are rendered from a viewpoint which may differ from the original or nominal viewpoint of the input data.

The image generator 107 is coupled to an output circuit 109 which generates an output signal that comprises the images rendered by the image generator 107. It will be appreciated that the specific format of the output signal depends on the specific embodiment and the characteristics of the display. For example, in some embodiments an output signal may be generated comprising encoded images. The encoding may for example be in accordance with a known encoding standard, such as an MPEG encoding standard. In other embodiments, the output signal may directly comprise a specific drive signal for a suitable display panel.

The system may thus change the viewpoint of the rendered image relative to the viewpoint of the input image data. In the specific example, the system is arranged to change the viewpoint in different ways and for different purposes. Indeed, some viewpoint changes are introduced to provide a noticeable and advantageous 3D effect to the user whereas other viewpoint changes are intended to be less noticeable to the user.

In particular, the system may introduce some viewpoint changes that are intended not to be noticed by the user.

In order to support such viewpoint changes, the system of FIG. 1 comprises a shot transition detector 111 which is arranged to detect shot transitions in the received sequence of images.

A shot is a consecutive sequence of images for which the visual changes are sufficiently small to be perceived as a single continuous observation of a single depicted scene. A shot can be considered as a series of interrelated consecutive pictures contiguously captured at a (possibly continuously moving) viewpoint and representing a continuous action in time and space. Typically, shot transitions are considered to occur if there is a scene change and/or the viewpoint for a given scene changes abruptly, e.g. when the viewpoint change in a given time interval exceeds a given threshold.

Shot transitions may be abrupt where the transition occurs from one image (frame) to the next or at least over few frames. In other cases, shot transitions may be more gradual and extended over more images/frames. In such scenarios, the transition may include a gradual merging of images from the two shots with a gradual fading out of the previous shot and a gradual fading in of the new shot.

It will be appreciated that any suitable criterion or algorithm for detecting shot transitions may be used without detracting from the invention.

For example, in some scenarios, the received video signal may comprise meta-data which indicates when shot transitions occur in the sequence of images. For example, during editing of a movie, data may be generated which indicates when there is a transition from one film clip to the next. This data may be included in the encoded signal. In such scenarios, the shot transition detector 111 may simply extract the meta-data indicating the shot transitions.

However, typically, the shot transition detector 111 is arranged to analyze the sequence of images to estimate where shot transitions occur. Such detection may typically be based on detection of a change in the characteristics of the contained images. Thus, the shot transition detector 111 may continuously generate various image characteristics and consider a shot transition to occur when a change in a characteristic meets a given criterion.

For example, a shot transition may be considered to occur when an average brightness and a color distribution changes by more than a given threshold within a given number of frames.

An overview of state-of-art shot transition detection methods, as well as an analysis of their workings, is available in: Alan F. Smeaton, "Video shot boundary detection: Seven years of TRECVid activity", Computer Vision and Image Understanding 114 (2010) 411-418, 2010.

As a more specific example of shot transition detection, consider a method that is based on computing the similarity of consecutive frames by scaling down the frames to a thumbnail size, reinterpreting the thumbnails as vectors, and then computing the L2 norm of consecutive vectors. A shot transition is detected if and only if the computed norm is above a predetermined threshold. The method can be extended by including a more complex frame similarity measure and/or by comparing not only consecutive frames but multiple frames in a window. The latter would allow for correct interpretation of gradual transitions as well as ignore false transitions such as light flashes.

It will be appreciated that in some embodiments, the shot transition detector 111 may include various parallel detection algorithms or criteria. For example, it may detect not only shot transitions but also whether these are hard transitions or gradual transitions.

The shot transition detector 111 is coupled to a viewpoint controller 113 which is further coupled to the image generator 107. The viewpoint controller 113 determines the rendering viewpoint which is used by the image generator 107 to generate the output display images. Thus, the viewpoint controller 113 determines the viewpoint for which the images are rendered.

In some cases, it is intended that the viewer notices that the viewpoint is changed. For example, an impression of the viewer looking around a foreground object to see elements of the background can be achieved by moving the rendering viewpoint correspondingly. However, in other scenarios it is intended to move the viewpoint without the user noticing. It is therefore desirable in some scenarios to reduce the perceptibility of changes in the rendering viewpoint.

The viewpoint controller 113 of FIG. 1 is arranged to achieve this by (at least sometimes) synchronizing the changes in the rendering viewpoint to the detected shot transitions. As a specific example, viewpoint changes may be restricted to only occur during shot transitions. This will result in viewpoint changes occurring in association with transitions in the presented content such that these viewpoint changes do not become as noticeable to the viewer.

For example, the input sequence of images may comprise a first shot of a statue seen from the front. The current rendering viewpoint may be offset to one side in order to provide a view of elements of the background occluded by the statue in a frontal view. This viewpoint may be maintained throughout the shot. When a shot transition occurs in the input images, e.g. to show a completely different scene, this is detected by the shot transition detector 111 which may in response move the rendering viewpoint back to the viewpoint of the input images. This will not be noticed by the user as the scene has changed completely and there is therefore no common or consecutive viewpoint reference for the two shots. At a later stage (e.g. at the next shot transition), the scene may switch back to the statue. However, the rendering viewpoint has now switched to that of the input stream and accordingly the statue will now be rendered from the front. However, this transition of viewpoint from the offset to the input viewpoint is perceptually much less significant and unpleasant than if the transition occurs during a shot of the statue. The approach may for example allow an improved user experience wherein a user may manually offset the viewpoint for a short time (e.g. by pressing a button on a remote control indicating a desire to look around a foreground object) with the system automatically returning to the authored viewpoint with a reduced perceptual impact of the switch back.

In the specific example of FIG. 1, the system further comprises an input 115 for receiving a position indication for a position of a viewer of the display. The position may for example be an accurate three dimensional position which is indicative of the position of the viewer relative to the display 103. In other examples, the position indication may be a rough indication of an angle of the user relative to the display plane. In some embodiments, the position indication may simply indicate a horizontal offset of the viewer relative to a center of the display.

It will be appreciated that any means for generating the position indication may be used and that in some embodiments, the means for generating the position indication may be part of the display system, and e.g. may be integrated with the image processing unit 101 or the display 103.

The system may for example include a head tracking or user tracking system. As an example, a camera may be placed on the display 103 and directed towards the viewing area. The images captured by the camera may be analyzed to detect image objects corresponding to heads of users and the position indication may be generated to reflect the position of these. As another example, the user may wear a device, such as an infrared transmitter, radiating signals which can be detected and used to determine a position. As yet another example, a user may wear a positioning determining device (such as a GPS enabled mobile phone) which determines a position and transmits it to the display system.

Specific examples of systems of determining a position indication for a user may e.g. be found in Carlos Morimoto et al., "Pupil Detection and Tracking Using Multiple Light Sources", Journal of Image and Vision Computing, 18(4), pp. 331-335, Elsevier, March 2000; Marco La Cascia et al., "Fast, Reliable Head Tracking under Varying Illumination: An Approach Based on Registration of Texture-Mapped 3D Models", IEEE Transactions on Pattern Analysis and Machine Intelligence (PAMI), 22(4), April 2000 and 3.

Johnny Chung Lee, "Hacking the Nintendo Wii Remote", IEEE Pervasive Computing magazine, volume 7, number 3, pp. 39-45, 2008.

The position input 115 is coupled to a position processor 117 which is arranged to determine a viewer viewpoint based on the received position indication. The viewer viewpoint estimate may in some cases be the same as the position indication but in many embodiments some processing of the position indication may be used to generate the viewer viewpoint estimate. For example, some filtering or averaging may be used or a geometric evaluation may be used to determine the viewing position relative to the display 109.

The position processor 117 is further coupled to the viewpoint controller 113 which is fed the viewer viewpoint estimate. The viewpoint controller 113 can then determine the rendering viewpoint in response to the viewpoint of the viewer.

This approach allows a very advantageous viewing experience to be achieved. Indeed, as the viewer moves his head, the rendered images can be dynamically and continuously adapted to reflect the current position of the user. For example, motion parallax can be implemented such that when the user moves his head in one direction, the image objects of the presented image are moved in the presented image to reflect the changes in viewpoint. Thus, the rendering viewpoint tracks the estimated viewer viewpoint to provide a natural experience, and to specifically provide the effect of viewing a three dimensional scene actually present behind the screen. Specifically, the tracking of the viewer's head movements may provide a perception of the display being a window through which a real three dimensional scene is scene.

For example, if the user moves his heads towards the left, the image objects (behind the display plane) are shifted to the left in accordance with the appropriate perspective and motion parallax rules. The degree of shift depends on the depth of the image object such that image objects at different depths have different displacements. Since the image generator 107 has 3D information for the input images, it is possible to determine the appropriate shifts for the presented images. Such an approach may specifically allow a 3D experience to be provided from a monoscopic 2D display as the differentiated depth dependent movement of image objects on the display when the user moves his head provides substantial 3D cues to the viewer. In other words, a 3D effect can be provided by a 2D display by implementing motion parallax for the presented images.

It is therefore desirable to make display systems aware of the viewer's position as this allows for more immersive display of 3D content, with or without stereopsis.

However, in many systems the image quality tends to degrade as the rendering viewpoint deviates from the viewpoint of the input images. For example, the required image data may simply not be available for image objects or areas that are de-occluded by the viewpoint change. In such scenarios the rendering of the modified viewpoint images fills in the gaps in the image using estimation techniques such as extrapolation and interpolation. Furthermore, the rendering algorithm may introduce errors and inaccuracies resulting in e.g. image artifacts or distorted perspective.

For example, for current 3D formats, such as Blu-ray and DVB 3D it has been found that the rendering artifacts increase as the viewer's position becomes increasingly eccentric thereby deviating more from the viewpoint of the input signal. Indeed, for these formats, there simply is no image data except for the nominal left and right views and therefore everything in the scene not visible from either of these viewpoints has to be estimated. Similar effects occur for other formats such as MPEG MVD and image+depth formats.

Therefore, there is in addition to the desire to render images from different viewpoints also a desire to render the images from the nominal viewpoint.

In the system of FIG. 1, this conflict is addressed by allowing the rendering viewpoint to follow and adapt to the viewer viewpoint while also biasing the rendering viewpoint towards a nominal viewpoint which specifically can correspond to the viewpoint of the input images. Thus, the system may allow a continuous adaptation to, and tracking of, the viewer's viewpoint while introducing a slow bias of the rendering viewpoint back to the nominal viewpoint. Thus, when the user moves his head, the presented images follow this movement to provide a motion parallax effect and a natural 3D experience. However, a bias is introduced such that the rendering viewpoint slowly reverses to the nominal viewpoint. The actual rendering viewpoint is thus a combination of the changes of the viewer viewpoint and the slow bias towards the nominal viewpoint.

Furthermore, the viewpoint bias is performed synchronously with the detected shot transitions. Thus, rather than introducing a non-viewer related continuous movement of the rendering viewpoint, the non-viewer related changes in the rendering viewpoint are performed synchronously with the shot transitions. This provides a much less perceptible bias and movement to the nominal viewpoint. Specifically it can avoid or mitigate that a slow continuous change of the rendering viewpoint is perceived as a slow panning/rotation of the scene. Such a non-user movement related panning/rotation will typically be perceived as undesirable and can even introduce effects such as motion sickness.

In the system, the bias of the rendering viewpoint is thus a non-viewer motion related component which introduces changes to the rendering viewpoint in synchronicity with the shot transitions. In particular, step changes may be introduced to the rendering viewpoint whenever a short transition occurs. As a shot transition is typically associated with a scene change or at least a substantially different viewpoint for the same scene, these step changes are typically not perceptible to the user. In the example, the bias to the rendering viewpoint may not be applied during the shot intervals between shot transitions, i.e. no non-viewer related changes to the rendering viewpoint are introduced between shot transitions.

At the same time, the changes in the rendering viewpoint due to changes in the viewer viewpoint may be tracked. Further, this tracking may be performed continuously and is not synchronized to the shot transitions. Thus, during shots (between shot transitions), the rendering viewpoint changes continuously to follow the viewer's head movements thereby providing a natural user experience with e.g. a strong motion parallax effect.

The approach thus allows for a differentiation between different changes in the rendering viewpoint. In particular, it allows for the viewer related changes to be clearly perceived by the user while at the same time allowing the non-viewer related changes to be substantially less noticeable to the user. The approach may allow a natural 3D effect to be provided to match head movements while at the same time allowing the average perceived image quality to be substantially increased.

Figure 2:
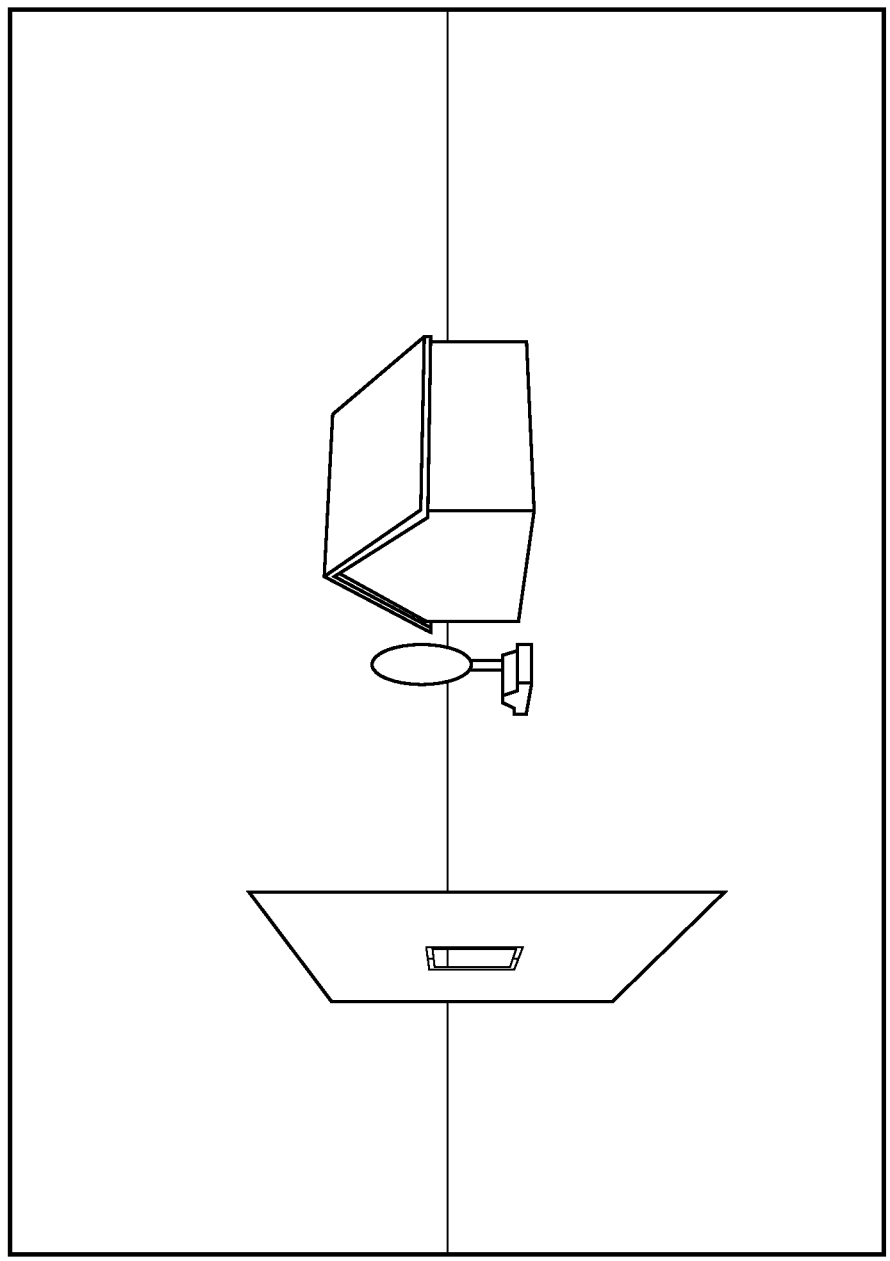
FIG. 2 illustrates a three dimensional scene.

The problems and principles previously described may be elucidated by considering a specific scene and how this is rendered on a display. FIG. 2 illustrates a scene 200 which is to be presented on a display. The scene comprises a car, a tree and a house, and the scene is seen through a display which ideally reacts like a window through which the scene is viewed. In the example, the display is a monoscopic display.

Figure 3:
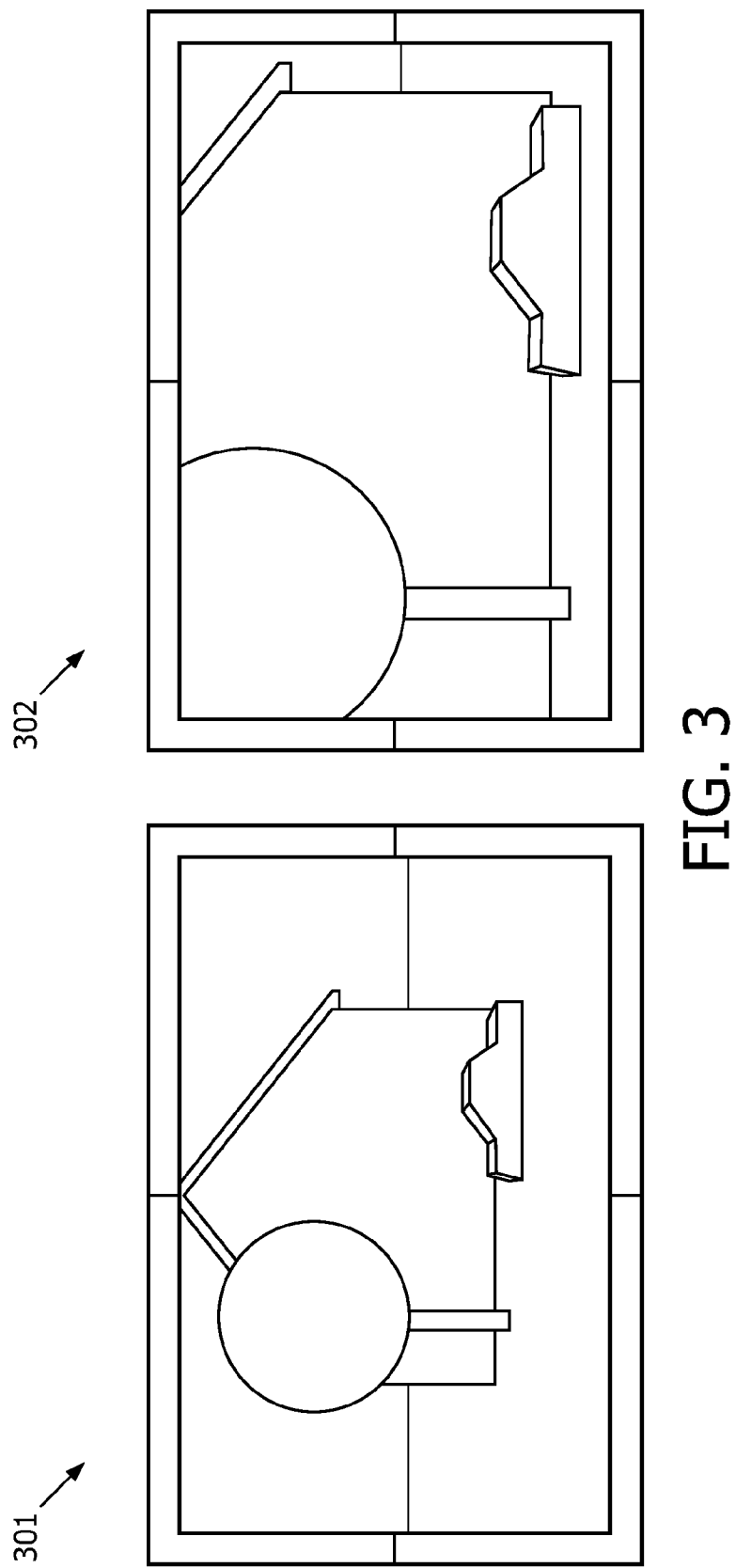
FIG. 3-9 discloses various two dimensional representations of the three dimensional scene of FIG. 1.

FIG. 3 illustrates a central view of the scene from a position close up 301 and further back 302 from the window. Thus, FIG. 3 illustrates what will be presented on the display from a central point of view.

Figure 4:
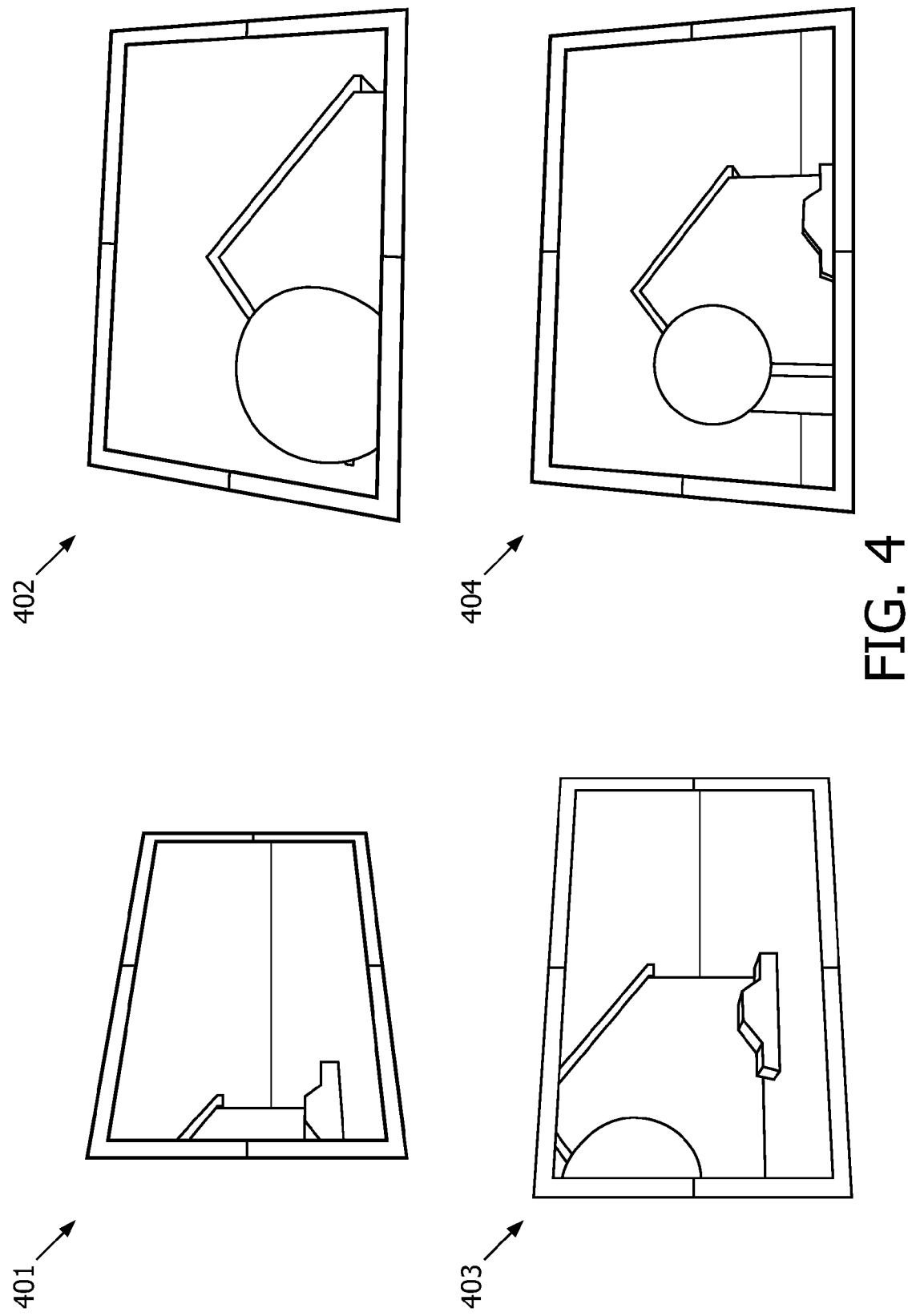
Figure 5:
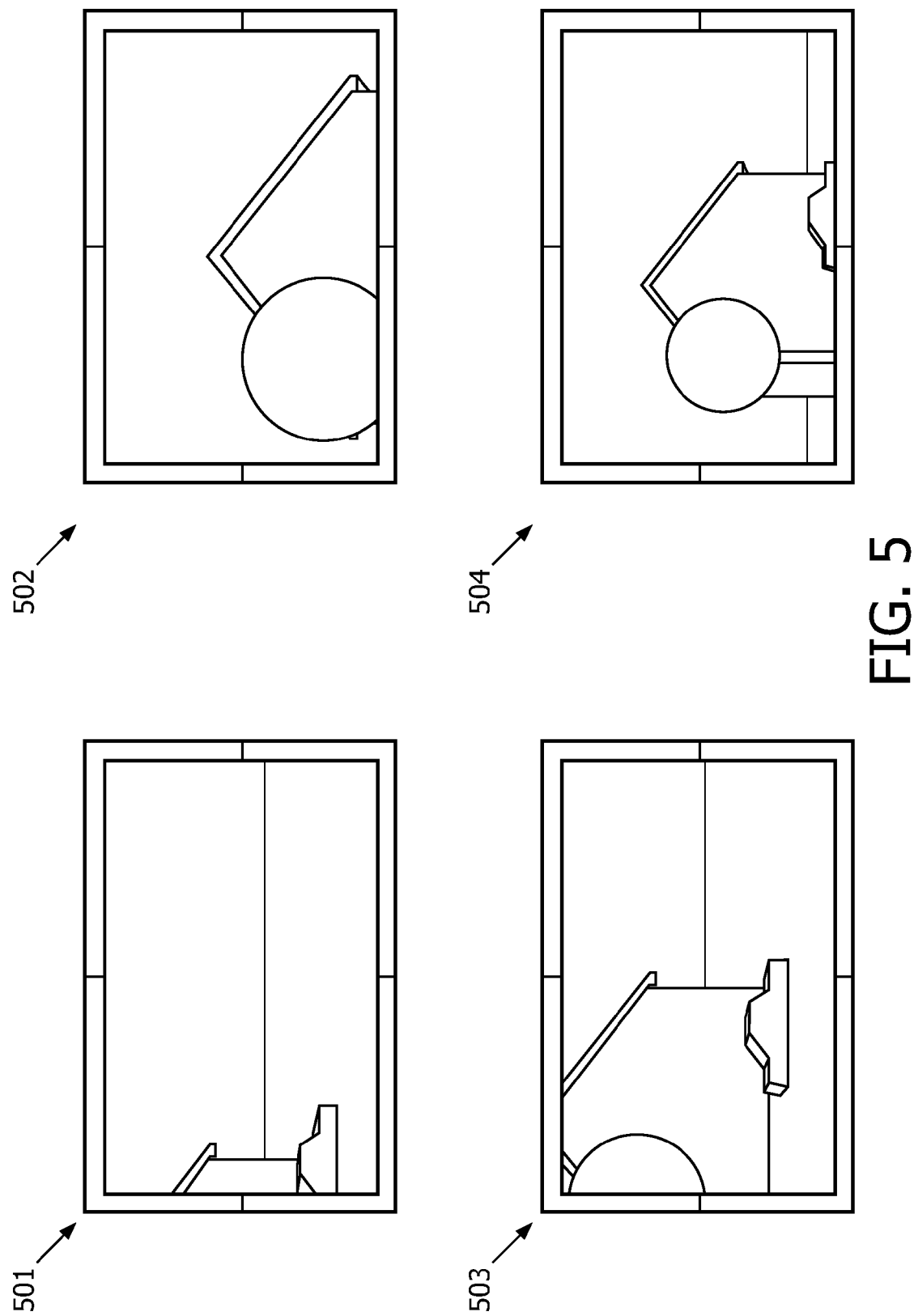

FIG. 4 illustrates four different viewpoints and the corresponding correct perspective view 401, 402, 403, 404 of the scene. FIG. 5 illustrates the images 501, 502, 503, 504 that will be presented on the display for these four viewpoints if correct perspective adjustment (i.e. viewpoint adjustment/ motion parallax) is performed. In the system of FIG. 1, this adjustment is performed by the viewpoint controller 113 adjusting the rendering viewpoint to track the user movements.

Figure 6:
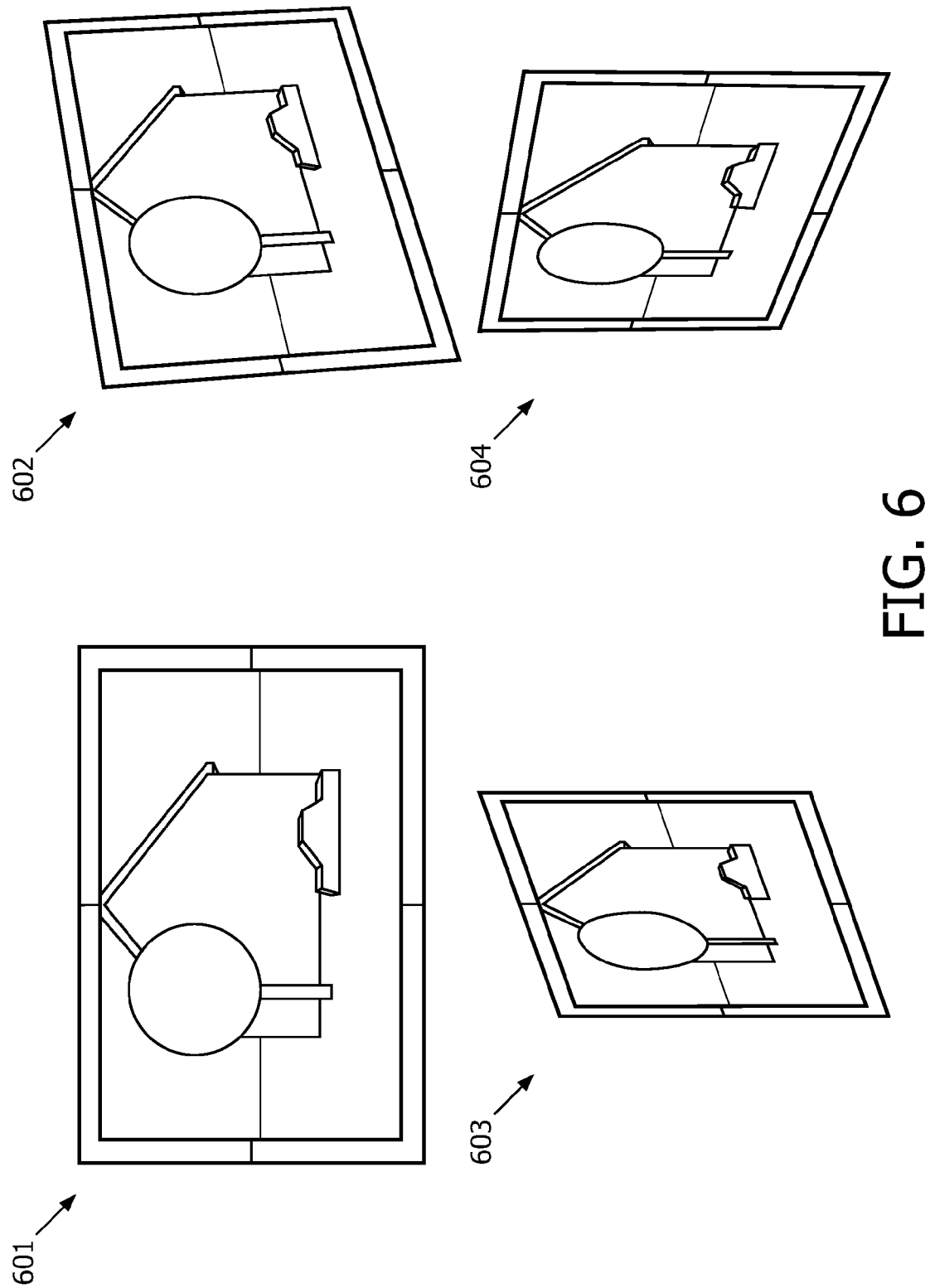

FIG. 6 illustrates the views 601, 602, 603, 604 that will be seen by a viewer from different viewpoints for a traditional display which does not include any perspective adjustment.

Figure 7:
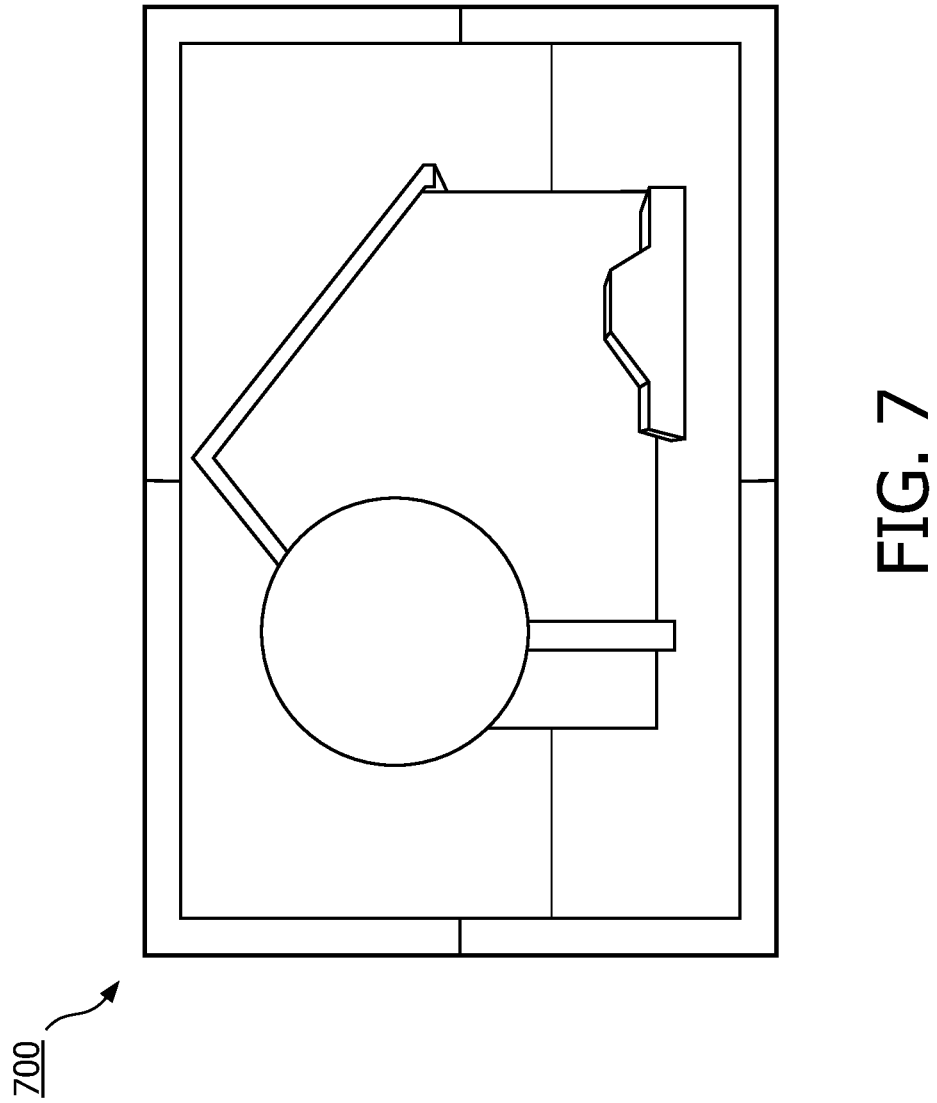
Figure 8:
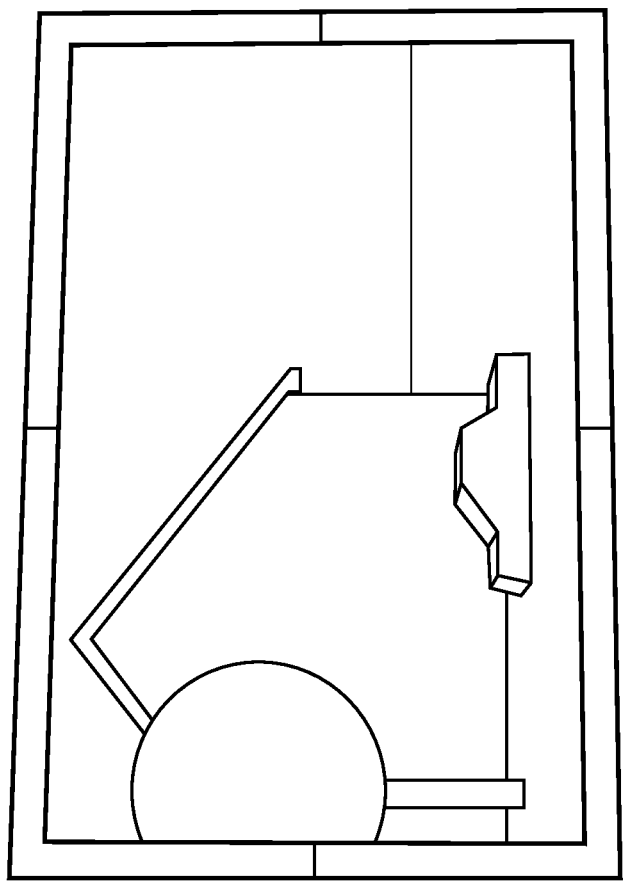

FIGS. 7 and 8 illustrate an example of how the system of FIG. 1 may adjust the rendering viewpoint to reflect the change in a viewer viewpoint. FIG. 7 illustrates the central image 700 when the viewer is at a viewing position corresponding to the nominal position (typically corresponding to a central authoring position). The viewer now moves horizontally to a position where the display is viewed partially from the side. The viewpoint controller 113 of FIG. 1 tracks this movement and changes the displayed image to reflect the movement as illustrated in image 800 in FIG. 8.

As can be seen, the display system reacts to provide a natural experience corresponding to the scenario where the 3D scene was seen through a window, i.e. as if the display was a window on the scene. However, the presented image corresponding to this new view is very different than the image of the central viewpoint (i.e. the nominal input viewpoint), and may require information which is not included in the encoding of the central view. For example, the front of the car is partially seen in the image of FIG. 8 but not in the image of FIG. 7. The information required to display the front of the car correctly may not be available as it is not included in the input images corresponding to the central view. The renderer may then try to approximate or estimate the correct image data, for example using hole filling techniques, but this will typically lead to rendering artifacts. As another example, the changed viewpoint results in a large area to the right of the house (seen from the front, i.e. on the right of FIG. 8) being visible in the view of FIG. 8 but not in the view of FIG. 7. The rendering algorithm will typically fill such an area by extrapolation, i.e. the neighboring areas will be extended into the new areas. However, if the scene contained any objects in this area, they would not be rendered in the view of FIG. 8 thereby resulting in rendering artifacts.

Also, processing and algorithmic imperfections tend to increase for increasing viewpoint offsets.

The view presented in FIG. 8 may therefore have reduced image quality, and accordingly the system of FIG. 1 biases the rendering viewpoint towards the nominal viewpoint. Thus, if the viewer remains static at the same position (to the side), the image processing unit 101 will switch the rendering viewpoint such that it eventually corresponds to the nominal viewpoint. This shifting is done synchronously with the shot transitions.

Figure 9:
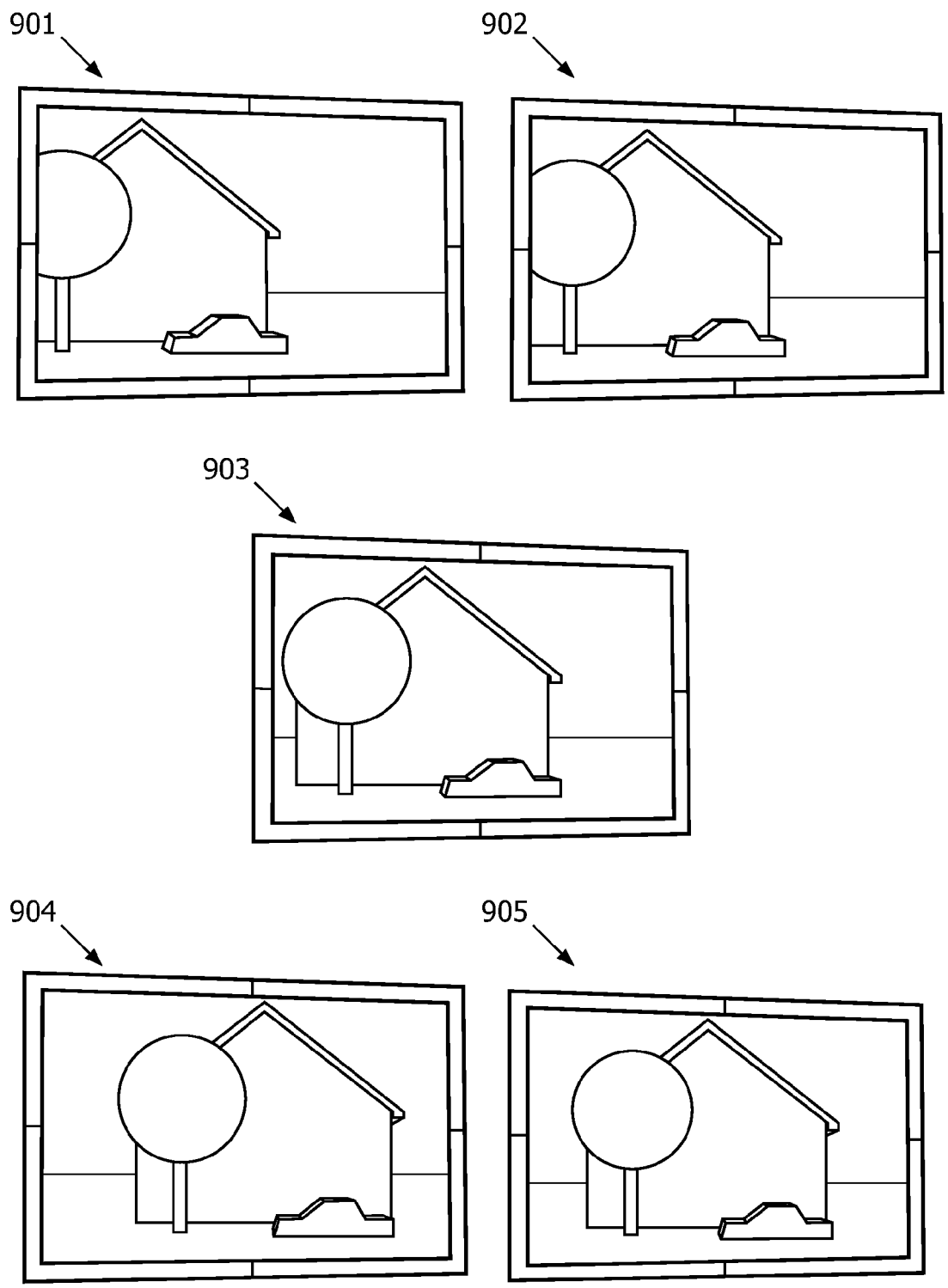

The approach is exemplified in FIG. 9 which shows the image presented to the viewer as he remains in the sideways position. The first image 901 shows the view corresponding to FIG. 8, i.e. the view immediately after the viewer has moved. This provides the user with a perspective change commensurate with his movement. The image sequence may then include one or more shot transitions and present other scenes. When the video returns to the scene, the rendering viewpoint has been shifted such that the rendering viewpoint no longer is the same as the viewer's viewpoint but rather is shifted towards the nominal (or reference) central view. This shift in viewpoint has occurred during shot transitions and thus without the user having a fixed continuous viewpoint reference. Therefore, it is not very noticeable to the user. Further scene changes may occur and at each shot transition a small change in the rendering viewpoint can occur such that the rendering viewpoint is moved back towards the nominal viewpoint. Thus, at the end of this process, the viewer is presented with a view that corresponds to the central view despite the viewer being positioned substantially to the side of the display.

By applying the invention in the above manner, the displayed images will provide motion parallax during viewer motion, resulting in a very smooth and natural experience. However, when the viewer has "permanently" chosen a position on the sofa, he will most likely prefer to watch the view as if he was sitting in a position corresponding to the "original viewpoint", i.e. the viewpoint that the director originally intended. In addition the viewer will then also experience a minimum of rendering artifacts as the rendering viewpoint is the same as the nominal viewpoint, albeit with some perspective distortion. The reversal to the nominal viewpoint is further advantageous, as it provides the best starting point for providing further dynamic motion parallax.

In the following a more detailed description of the principles used by the image generator 107 when rendering images at different viewpoints will be provided.

Figure 10:
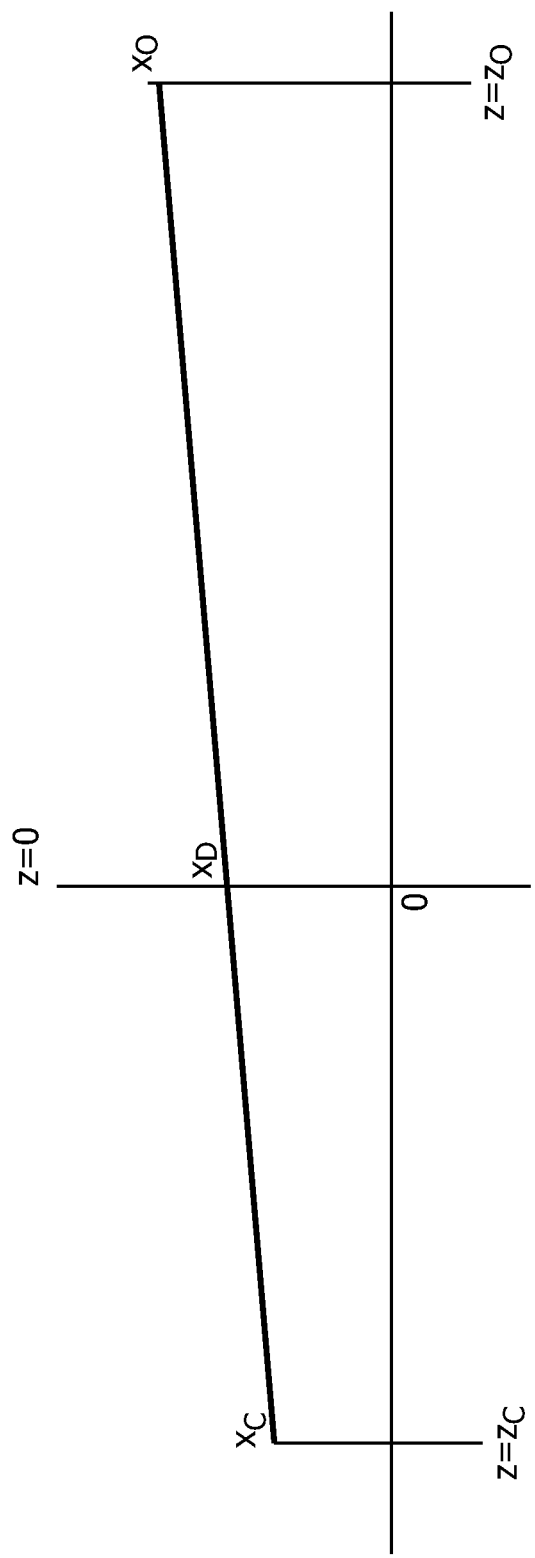
FIG. 10 illustrates an example of projection when presenting a three dimensional scene on a display.

The principle of projection is illustrated in FIG. 10. Given a camera that is modeled as a pinhole and positioned at $\vec{x}_C=(x_C, y_C, z_C)$ (i.e. the authoring or content viewpoint), an object point $\vec{x}_O=(x_O, y_O, z_O)$, and (without loss of generality) a display plane $z=0$ such that $\vec{x}_D=(x_D, y_D)$ is the 2D coordinate system of this plane, then the following perspective relation holds, noting that typically $z_C<0$:

$$\begin{bmatrix} \vec{x}_D \\ 0 \end{bmatrix} = \frac{z_O}{z_O - z_C} \vec{x}_C - \frac{z_C}{z_O - z_C} \vec{x}_O. \quad (1)$$

The display coordinate system may be scaled, for instance to represent pixels, but for simplicity we keep the same units for both coordinate systems. For a typical 2D display system, the camera (eye) is assumed to be centered such that $\vec{x}_C=(0,0,z_C)$ with $-z_C$ the optimal viewing distance, simplifying equation (1) to:

$$\begin{bmatrix} x_D \\ y_D \end{bmatrix} = \frac{-z_C}{z_O - z_C} \begin{bmatrix} x_O \\ y_O \end{bmatrix}. \quad (2)$$

For stereoscopic display systems, disparity is typically defined as the difference in projection of the left (L) and right (R) image and can be easily found based on equation (1). With equal $z_C$ for L and R the disparity relation simplifies to:

$$\begin{bmatrix} \vec{x}_{D,R} - \vec{x}_{D,L} \\ 0 \end{bmatrix} = \frac{z_O}{z_O - z_C} (\vec{x}_{C,R} - \vec{x}_{C,L}). \quad (3)$$

For a typical stereoscopic system, two cameras are displaced horizontally such that there is a separation $\Delta x_C$. For realism the separation should equal the intraocular distance which on average is about 65 mm for adults but typically less separation is used for authoring. In any case, the depth-disparity relation becomes:

$$\Delta x_D = \frac{z_O}{z_O - z_C} \Delta x_C. \quad (4)$$

Here $\Delta x_D$, is the horizontal disparity of object point O and there is no vertical disparity. The relation between disparity ($\Delta x$) and depth ($z$) is non-linear: infinite depth gives disparity equal to the camera separation while screen depth gives. For image-based depth rendering it is often beneficial to choose disparity over depth as it better maps to the rendering problem. The depth value typically stored in depth maps is often an affine mapping of disparity:

$$\Delta x_D = A \Delta x_C + B. \quad (5)$$

Where A is a gain and B is an offset. These depth values can be converted back to disparity values by the image generator 109.

If no explicit depth map or data is provide in the input signal, such information can often be estimated from the video data. Indeed, if the input signal comprises stereo images, algorithms known as depth estimators or disparity estimators can be used to estimate the depth of image objects based on detection of corresponding image objects in the two images and determination of a disparity between these. Indeed, algorithms have even been proposed for estimating depth from single two-dimensional images.

In current stereoscopic display devices disparity estimators are being employed to assist in what is known in the field as baseline correction. That is the generation of a new stereo-sequence with a different baseline distance different from the baseline distance of the original stereo-sequence. The baseline correction process typically comprises estimating of dedicated disparity maps based on the input stereo sequence and the subsequent rendering of a new stereo-pair based on the respective image and disparity map. The latter rendering step involves horizontal displacements of pixels based on the established disparity values, In the system of FIG. 1, the image processing unit 101 has information of the eye positions of the viewer(s). Thus the viewpoint $\vec{x}_C(t)$ is known for all left and right eyes. In the most general case, namely equation (1), this generates both horizontal as well as vertical disparities. Reasons for vertical disparities are:

Left and right eye do not have the same viewing distance: $z_{C,L} \neq z_{C,R}$, The eyes are not level and at display height: $y_{C,L} \neq 0 \cup y_{C,R} \neq 0$.

However, in the system of FIG. 1 there is no consideration of the adjustment of the viewpoint in vertical direction. This may specifically be achieved by:

Using an average (or min/max/left/right) viewing distance:

$$\tilde{z}_C = \frac{z_{C,L} + z_{C,R}}{2},$$

Disregarding the measured y coordinates: $\tilde{y}_C = 0$.

This allows us to use the same rendering routines but with time-varying A and B:

$$\begin{bmatrix} A(t) \\ B(t) \end{bmatrix} = \theta(\vec{x}_C(t)). \quad (6)$$

In the general case of equation (1) left and right eye may also have vertical disparity. This disallows us from using a simple scanline-based view rendering algorithm.

Having image+depth content, we may want to rewrite (1) as:

$$\vec{x}_O = \frac{z_O}{z_C}\vec{x}_C - \frac{(z_O - z_C)}{z_C}\begin{bmatrix} \vec{x}_D \\ 0 \end{bmatrix}. \quad (7)$$

This provides the world coordinate $(\vec{x}_O)$ that is associated with a pixel $(\vec{x}_D)$ based on a reference camera position $\vec{x}_C$ and the pixel depth $z_O$. We can then map this coordinate back to the display plane knowing the actual camera/eye position $\vec{x}_E$ (thus $\vec{x}_E$ is the viewer viewpoint determined by the head tracking functionality):

$$\begin{bmatrix} \vec{x}'_D \\ 0 \end{bmatrix} = \frac{z_O}{z_O - z_E}\vec{x}_E - \frac{z_E}{z_O - z_E}\vec{x}_O \quad (8)$$

$$= \frac{z_O}{z_O - z_E}\vec{x}_E - \frac{z_E}{z_O - z_E}\left(\frac{z_O}{z_C}\vec{x}_C - \frac{(z_O - z_C)}{z_C}\begin{bmatrix} \vec{x}_D \\ 0 \end{bmatrix}\right)$$

$$= \frac{z_O}{z_O - z_E}\vec{x}_E - \frac{z_O}{z_O - z_E}\frac{z_E}{z_C}\vec{x}_C + \frac{z_O - z_C}{z_O - z_E}\frac{z_E}{z_C}\begin{bmatrix} \vec{x}_D \\ 0 \end{bmatrix}$$

We can decompose the contributions to viewing distance ($z_E$) and position ($\vec{x}_E$). To obtain only sideways viewing position correction, we assume $z_E = z_C$, and obtain the relations:

$$\begin{bmatrix} \vec{x}'_D \\ 0 \end{bmatrix} = \frac{z_O}{z_O - z_C}(\vec{x}_E - \vec{x}_C) + \begin{bmatrix} \vec{x}_D \\ 0 \end{bmatrix} \quad (9)$$

To obtain only viewing distance correction, we assume that $$\vec{x}_E = \frac{z_E}{z_C}\vec{x}_C$$

and obtain:

$$\begin{bmatrix} \vec{x}'_D \\ 0 \end{bmatrix} = \frac{z_O - z_C}{z_O - z_E}\frac{z_E}{z_C}\begin{bmatrix} \vec{x}_D \\ 0 \end{bmatrix} \quad (10)$$

In the above discussion, we have assumed the availability of the position (viewpoint) of the camera views $\vec{x}_{C,L}$ and $\vec{x}_{C,R}$. Without this knowledge it is still possible to assume a typical display size and viewing distance. Depending on this choice, the content may to be realistic, flattened or elongated in z-direction. Similarly it is possible that the mapping of depth values to disparity is unknown. In that case it is possible to map the depth values to a disparity range that is comfortable. Also in case of stereoscopic content it is possible that the disparity is only artistic and does not relate well to real world coordinates. In all cases, it is still possible to offer motion parallax.

To render/draw the image+depth content with motion parallax and viewpoint correction, we are required to use an image warping method that takes as input the (color) image and a vector field with 2-D disparities. Such methods are known from WO 1997023097.

The quality of such methods depends on how far the image has to be warped. The variance of the disparity map may be an indication of the amount of rendering artifacts.

The system tracks the position $\vec{x}_E$ of the eyes of each of the users of the system in relation to the display panel at position $\vec{x}_D$. The system also maintains a rendering viewpoint position of each of eyes, denoted $\vec{x}_V$. The rendering is based on the rendering viewpoint. For realistic (but artifact-ridden) rendering of image+depth content $\vec{x}_V = \vec{x}_E$. For standard rendering without motion parallax, $\vec{x}_V = \vec{x}_C$, with $\vec{x}_C$, the camera position as before.

When a movement of the user in respect to the display is observed by the display system of FIG. 1, the rendering viewpoint position may be adjusted to follow the detected viewer viewpoint:

$$\frac{\partial \vec{x}_V}{\partial t} = \frac{\partial \vec{x}_E}{\partial t} \quad (11)$$

This approach is followed in between shot transitions, i.e. during shots. However, when it is estimated that a set of images/frames correspond to a shot transition, the rendering viewpoint for the user is adjusted towards the nominal viewpoint in order to reduce image degradation. This can specifically be done by changing the rendering viewpoint to correspond to the nominal (original/authored/central) viewpoint:

$$\vec{x}_V := \vec{x}_C \quad (12)$$

In other embodiments a smoother transition/bias is introduced such that e.g. smaller steps are taken towards the nominal viewpoint at each shot transition, such as e.g.

$$\vec{x}_{V,n+1} := \vec{x}_{V,n} + (\vec{x}_C - \vec{x}_{V,n}) \cdot \mu \quad (13)$$

The described approach can be used in connection with different types of display.

In particular, the system can be used with a traditional monoscopic display which presents only a single image (view) to the user. In this case, a very convincing 3D effect can be obtained by implementing motion parallax despite the same image being presented to the two eyes of a user. Indeed, by tracking the viewer viewpoint and amending the rendered viewpoint accordingly, the display can present the view that will be seen from the actual viewer viewpoint. This enables the effect of looking around objects and the perspective changing corresponding to that of a real 3D scene.

In other embodiments, the display may be a stereoscopic image which provides different images to the two eyes of the user. The display may for example be a time sequential display which alternates between images for each of the viewpoints of the eyes of a user and with the viewer wearing shutter glasses synchronized to the image switching. In this case a more effective and stronger 3D experience may be achieved with the system utilizing both stereoscopic and motion parallax 3D cues.

In such a system, the viewpoint controller 113 may generate a rendering viewpoint for each of the right and the left eye and the image generator 107 may generate the individual display images for the corresponding viewpoint. Alternatively, the viewpoint controller 113 may generate a single rendering viewpoint and the image generator 107 may itself offset the rendering viewpoint by a fixed offset for each of the two rendered images. E.g. the rendering viewpoint may correspond to a viewpoint midway between the user's eyes and the image generator 107 may offset this by opposite amounts for each of the left and right eye viewpoints.

The approach may further be useful for autostereoscopic displays. Such displays currently typically generate a relatively large number of viewing cones corresponding to different viewpoints. As the user moves, the eyes may switch between the different viewing cones thereby automatically providing a motion parallax and stereoscopic effect. However, as the plurality of views are typically generated from input data referred to the central view(s), the image degradation increases for the outer views. Accordingly, as a user moves towards the extreme views, he will perceive a quality degradation. The described system may address this by changing the rendering viewpoints. For example, if the viewer has been positioned in the outer views for a given duration, the views may be switched such that the outer views do not present images corresponding to the outer viewpoint but instead presents images corresponding to viewpoints closer to the center. Indeed, the system may simply switch the images from the more central viewing cones to be rendered in the outer viewing cones if the user has been positioned there for a sufficient duration. In the described system, this image/cone switching may be synchronized with the shot transitions in order to reduce the noticeability by the viewer.

Thus, when a viewer moves sideways relative to the autostereoscopic display, he will have a natural experience with the display providing a 3D experience through both the stereopsis and motion parallax effects. However, the image quality is reduced towards the sides. If the user remains at a sideways position however, the display will automatically adapt by gradually and without the user noticing, changing the rendering viewpoint for the images of the outer viewing cones such that they eventually present the central images. Thus, the image quality will automatically be increased and the display will adapt to the now viewing position for the user.

It will be appreciated that the biasing may in some embodiments be a fixed predetermined biasing. However, in many embodiments, the biasing may be an adaptive bias such that the changes of the rendering viewpoint e.g. towards the nominal viewpoint depends on various operating characteristics.

For example, the bias may depend on the rendering viewpoint, the viewer viewpoint, or on the nominal viewpoint, or indeed on the relations between these.

Specifically, the bias may depend on a difference between the rendering viewpoint and the nominal viewpoint. For example, the further the rendering viewpoint is from the nominal viewpoint, the larger the image quality degradation and accordingly the bias towards the nominal viewpoint may be increased for an increasing offset. Therefore, when the user is further to the side of the display, the quicker the adaptation of the rendering viewpoint to correspond to the nominal or the authoring viewpoint may be.

Further, the (degree of) bias may be dependent on a difference between the rendering viewpoint and the viewer viewpoint. For example, for smaller movements and variations of the viewer around the nominal view, it may be preferred not to introduce any biasing towards the nominal view at all as quality degradations are unlikely to be significant. However, if the viewer viewpoint deviates by more than a given threshold, the degradation may be considered unacceptable and the biasing towards the nominal viewpoint may be introduced. In more complex embodiments, the degree of bias may be determined as e.g. a continuous and/or monotonous function of the difference between the viewer viewpoint and the nominal viewpoint. The degree of bias may for example be controlled by the size or speed of the changes being adjusted, such as e.g. by adjusting the step size for the change applied at each shot transition or how often changes are applied during shot transitions.

In some embodiments, the bias may be dependent on a content characteristic for the sequence of images. Thus, the biasing may be adjusted to match the specific content/images which are being presented.

For example, the biasing may be dependent on an estimated shot transition frequency and/or a shot duration (i.e. a time between shot transitions). For example, if many and frequent shot transitions occur, the step change of the rendering viewpoint for each shot transition may be relatively small whereas if only few and infrequent shot changes occur, the step change in the rendering viewpoint may be set relatively large for each shot transition.

In some embodiments, the shot transition frequency or interval may be determined from the input signal by introducing a delay in the rendering pipeline. In other embodiments, the future behavior may be predicted based on the previous characteristics.

In some embodiments, the biasing may be dependent on a depth characteristic for the input images. For example, if there are large depth variations with sharp depth transitions, it is likely that the image quality degradation is relatively larger than for images wherein there are only small depth variations and no sharp depth transitions. For example, the latter case may correspond to an image that only contains background and which accordingly will not change much from different viewpoints (e.g. with few or no de-occluded areas). In the first case, a relatively strong bias may be introduced to quickly return the rendering viewpoint to the nominal viewpoint and in the latter case a slow return to the nominal viewpoint may be implemented.

In some embodiments, the biasing may be adapted based on a quality degradation indication calculated for the rendering viewpoint. Indeed, the rendering algorithm of image generator 107 may itself generate an indication of the degradation introduced. As a simple example, a measure of rendering artifacts may be generated by evaluating how large a proportion of the image has been de-occluded without corresponding occlusion data being available, i.e. the quality indication may be determined by the rendering algorithm keeping track of the image areas for which the image data is generated by extrapolation or interpolation from other image areas. In case of high image degradation, a large bias resulting in a fast return to the nominal viewpoint may be implemented whereas for low image degradation a low degree of bias may be implemented.

It will be appreciated that many other algorithms and parameters may be used to adapt the biasing in different embodiments.

In some scenarios, it may be considered insufficient to only introduce the bias during shot transitions. For example, in some scenarios there may not be any shot transitions for a very long time resulting in a long duration with reduced image quality. Similarly, if only very few shot transitions occur, these may require the step change for each shot transition to be relatively large thereby resulting in a very noticeable effect.

In some embodiments, the viewpoint controller 113 may accordingly be able to switch to a second mode of operation wherein the rendering viewpoint is still biased towards the nominal viewpoint but without this being done synchronously with the shot transitions (or only partially being done synchronously with the shot transitions, i.e. at least part of the bias changes are non-synchronous).

For example, in the absence of shot transitions, the system may revert to a slow continuous bias of the rendering viewpoint towards the nominal viewpoint. This will be perceived by the users as a slow panning of the image towards the image corresponding to the central position. Although, the effect may be more noticeable than when the bias is synchronized to the shot transitions, it may provide an improved trade-off by substantially reducing the time in which a lower quality image is perceived by the user.

The decision of when to switch to the second mode of operation may be based on many different considerations. Indeed, the parameters and considerations described with reference to the adjustment of the degree of bias also apply to the decision of when to switch to the second mode of operation. Furthermore, characteristics of the non-synchronous bias may also be adjusted equivalently and based on the same considerations as for the synchronous bias.

The system may implement a user disturbance model which evaluates factors such as the viewer viewpoint relative to the central nominal viewpoint, the characteristics of the depth data, the quality indication generated be the rendering algorithm etc., and may determine whether to introduce a non-synchronous bias of the rendering viewpoint as well as possibly the characteristics of this biasing.

Figure 11:
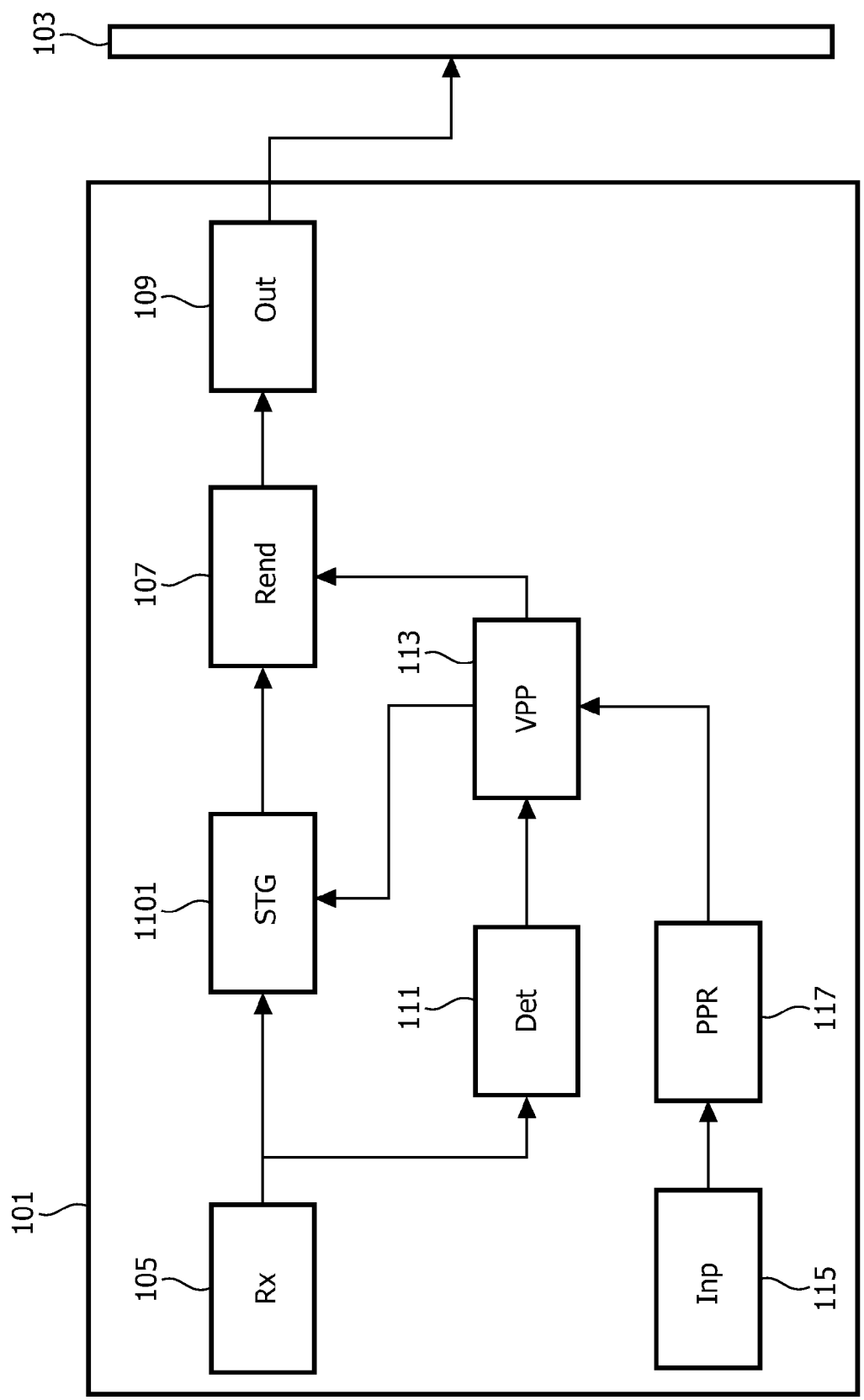
FIG. 11 illustrates examples of a display system in accordance with some embodiments of the invention.

Alternatively or additionally, the image processing unit 101 may be arranged to actively introduce shot transitions to the image stream. An example of such an embodiment is illustrated in FIG. 11. In the example, the image processing unit 101 further comprises a shot inserter 1101 coupled between the receiver 105 and the image generator 107. The shot inserter 1101 is furthermore coupled to the viewpoint controller 113.

In the example, the viewpoint controller 113 may identify that the number of shot transitions is insufficient to provide the desired bias. As an extreme example, no shot transitions may have occurred for a very long time. Accordingly, the viewpoint controller 113 may send a signal to the shot inserter 1101 controlling it to insert shot transitions. As a low complexity example, the shot inserter 1101 may simply insert a fixed sequence of images into the image stream resulting in a disruption to the long shot. In addition, the viewpoint controller 113 will synchronously change the rendering viewpoint during the shot transitions thereby biasing the rendering viewpoint towards the nominal viewpoint.

The introduction of additional "fake" shot transitions may result in a bias operation which is much less intrusive and noticeable. It will be appreciated that many different ways of introducing shot transitions can be implemented, including for example inserting a previously received sequence of images (e.g. a panoramic shot may be detected and reused), introducing predetermined images, inserting dark images etc. As another example, the shot transition may be introduced by the image generator 107 generating a short sequence of the same scene but from a very different viewpoint before switching back to the bias adjusted viewpoint. This may ensure continuity in the presented content while introducing a less noticeable bias adjustment. In effect, the user will perceive a camera "shift" back and forth between two cameras while still watching the same time continuous scene or content.

The exact preference and indeed whether additional shot transitions are desirable or not will depend on the characteristics of the individual embodiment and use scenario.

The introduction of shot transitions may specifically be dependent on a shot duration characteristic meeting a criterion, such as e.g. generating a shot transition when the time since the last shot transition exceeds a threshold. Further, the introduction of additional shot transitions may alternatively or additionally be dependent on the rendering viewpoint meeting a criterion. For example, shot transitions may only be introduced when the rendering viewpoint differs by more than a given threshold from the nominal viewpoint, i.e. it may only be introduced for extreme views.

In some embodiments, the introduction of shot transitions may specifically be dependent on a quality degradation indication for the rendered images meeting a criterion. For example, shot transitions are only introduced when the quality measure generated by the rendering algorithm of the image generator 107 falls below a threshold.

In some embodiments where an autostereoscopic display is used, a shot transition may be introduced in response to a detection of the viewer being in a situation where he might cross a viewing cone boundary. Thus, when it is detected that a viewer observes a view located at the edge of the viewing cone or close to it, the system may trigger a shot transition. This may reduce the perceptibility of or even mask the viewing cone transition altogether and may in many scenarios reduce the noticeability of the biasing of the rendering viewpoint.

In some embodiments, the viewpoint controller 113 is arranged to limit the rendering viewpoint relative to a nominal viewpoint for the display. The limiting may be a soft or a hard limiting. For example, the rendering viewpoint may track the viewer viewpoint but only until the viewer viewpoint differs by more than a given threshold from the nominal viewpoint. Thus, as a viewer moves sideways, the presented image may adapt accordingly until the user moves further than a given distance after which the image will not follow the viewer. Specifically, the viewer can only look around an object to a certain degree. This may ensure that image quality degradations do not exceed a given level.

Specifically, the motion parallax may be realistic or may be non-linear such that the motion parallax effect decreases (softly or abruptly) with distance to the center position. This effect can be obtained by transforming $\vec{x}_V$:

$$\vec{x}_V = \pi(\vec{x}_V, \vec{x}_C) \tag{14}$$

It is typically preferable to limit the amount of motion parallax to avoid rendering errors in the absence of shot cuts, for instance by imposing a maximum distance between rendering and camera viewpoints. This can be achieved as:

$$\pi:(\vec{x}_V, \vec{x}_C) \to \begin{cases} \vec{x}_V & \|\vec{x}_V - \vec{x}_C\| < \gamma \\ \vec{x}_C + (\vec{x}_V - \vec{x}_C) & \text{otherwise} \end{cases} \tag{15}$$

This equation corresponds to a clipping of the rendering viewpoint $\vec{x}_V$ on a sphere with center $\vec{x}_V$ and radius $\gamma$. As another example, a soft clipping may be introduced as follows using a soft clipping function $\rho(\vec{x}_V, \vec{x}_C) \leq 1$:

$$\pi:(\vec{x}_V, \vec{x}_C) \to \vec{x}_C + \rho(\vec{x}_V, \vec{x}_C)(\vec{x}_V - \vec{x}_C) \tag{16}$$

An example implementation of $\rho(\vec{x}_V, \vec{x}_C)$ is an exponential mapping:

$$\rho(\vec{x}_V, \vec{x}_C) = 1 - e^{-\left(\frac{\|\vec{x}_V - \vec{x}_C\|}{\beta}\right)^p}, \tag{17}$$

where $\rho$ and $\beta$ are tunable parameters.

The previous description has focused on a scenario with only one viewer. However, it will be appreciated that the approach may also be used for multiple viewers. For example, the system may track the position of a plurality of users and adapt the rendering viewpoint to present the best compromise for multiple users. In other scenarios, it may be possible to separate views for the different users (e.g. for an autostereoscopic display where the users are in different viewing cones or for displays presenting a plurality of user specific cones). In such scenarios, the approach may be applied individually for each user.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data traveling via a network connection—wired or wireless—, or program code on paper. Apart from program code, characteristic data required for the program may also be embodied as a computer program product. Some of the steps required for the operation of the method may be already present in the functionality of the processor instead of described in the computer program product, such as data input and output steps.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus for generating a signal for a display, the apparatus comprising:
 a receiver circuit for receiving a video signal comprising three-dimensional data for a sequence of images;
 an image generator circuit for generating a plurality of display images for the sequence of images based on the three dimensional data and a rendering viewpoint;
 a shot transition detector circuit for detecting shot transitions in the sequence of images;
 a viewpoint controller circuit for changing the rendering viewpoint in synchronization with the detected shot transitions; and
 a signal generator circuit for generating the signal to comprise the plurality of display images
 wherein the viewpoint controller circuit is arranged to switch to a second mode of operation in response to a criterion being met,
 wherein the viewpoint controller circuit when in the second mode of operation is arranged to bias the rendering viewpoint towards a nominal viewpoint for the display by changing the rendering viewpoint towards the nominal viewpoint non-synchronously with the shot transitions.

2. The apparatus of claim 1 further comprising:
 an input circuit for receiving a position indication for a position of a viewer of the display;
 a processor circuit for determining a viewer viewpoint estimate in response to the position indication; and
 wherein the viewpoint controller circuit is arranged to determine the rendering viewpoint in response to the viewer viewpoint estimate.

3. The apparatus of claim 2 wherein the viewpoint controller circuit is arranged to adjust the rendering viewpoint to track changes in the viewer viewpoint estimate non-synchronously to the shot transitions.

4. The apparatus of claim 2 wherein a biasing of the rendering viewpoint towards a nominal viewpoint is dependent on at least one of:
 a difference between the rendering viewpoint and a nominal viewpoint;
 a difference between the viewer viewpoint estimate and a nominal viewpoint;
 a content characteristic for the sequence of images;
 a depth characteristic for the sequence of images;
 a short transition frequency estimation; a shot duration; and
 a quality degradation indication for the rendering viewpoint.

5. The apparatus of claim 1 wherein the viewpoint controller circuit is arranged to introduce a step change to the rendering viewpoint in connection with a shot-transition.

6. The apparatus of claim 1 wherein the viewpoint controller circuit is arranged to bias the rendering viewpoint towards a nominal viewpoint by changing the rendering viewpoint towards the nominal viewpoint in synchronization with the shot transitions.

7. The apparatus of claim 1 wherein the display is a monoscopic display.

8. The apparatus of claim 1 wherein the display is a stereoscopic display.

9. The apparatus of claim 1 further comprising a shot cut generator circuit arranged to introduce a shot cut to the sequence of images.

10. The apparatus of claim 9 wherein the shot cut generator circuit is arranged to introduce the short cut in response to at least one of:
 a shot duration characteristic meeting a criterion;
 the rendering viewpoint meeting a criterion;
 a quality degradation indication meeting a criterion; and
 a detection of a viewer crossing a viewing cone boundary for an autostereoscopic display.

11. The apparatus of claim 1 wherein the viewpoint controller circuit is arranged to limit the rendering viewpoint relative to a nominal viewpoint.

12. A method of generating a signal for a display, the method comprising:
 receiving a video signal comprising three-dimensional data for a sequence of images;
 generating a plurality of display images for the sequence of images based on the three dimensional data and a rendering viewpoint;
 detecting shot transitions in the sequence of images;
 changing the rendering viewpoint in synchronization with the detected shot transitions; and
 generating the signal to comprise the plurality of display images
 wherein the viewpoint controller circuit is arranged to switch to a second mode of operation in response to a criterion being met,
 wherein the viewpoint controller circuit when in the second mode of operation is arranged to bias the rendering viewpoint towards a nominal viewpoint for the display by changing the rendering viewpoint towards the nominal viewpoint non-synchronously with the shot transitions.

13. A computer program product comprising computer program code disposed on a non-transitory computer readable medium, computer code arranged to perform all the steps of claim 12 when said program is run on a computer.

14. A display comprising:
 a receiver circuit for receiving a video signal comprising three-dimensional data for a sequence of images;
 an image generator circuit for generating a plurality of display images for the sequence of images based on the three dimensional data and a rendering viewpoint;
 a shot transition detector circuit for detecting shot transitions in the sequence of images;
 a viewpoint controller circuit for changing the rendering viewpoint in synchronization with the detected shot transitions; a display panel; and
 a display driver circuit for driving the display panel to render the plurality of display images
 wherein the viewpoint controller circuit is arranged to switch to a second mode of operation in response to a criterion being met,
 wherein the viewpoint controller circuit when in the second mode of operation is arranged to bias the rendering viewpoint towards a nominal viewpoint for the display by changing the rendering viewpoint towards the nominal viewpoint non-synchronously with the shot transitions.

15. The method of claim 12 further comprising introducing a shot cut to the sequence of images in response to a shot duration characteristic meeting a criterion.

16. The method of claim 12 further comprising introducing a shot cut to the sequence of images in response to the rendering viewpoint meeting a criterion.

17. The method of claim 12 further comprising introducing a shot cut to the sequence of images in response to a quality degradation indication meeting a criterion.

18. The method of claim 12 further comprising introducing a shot cut to the sequence of images in response to a detection of a viewer crossing a viewing cone boundary for an autostereoscopic display.

19. The display of claim 14 further comprising:
- an input circuit for receiving a position indication for a position of a viewer of the display;
- a processor circuit for determining a viewer viewpoint estimate in response to the position indication; and
- wherein the viewpoint controller circuit is arranged to determine the rendering viewpoint in response to the viewer viewpoint estimate.

20. The display of claim 19 wherein the viewpoint controller circuit is arranged to adjust the rendering viewpoint to track changes in the viewer viewpoint estimate non-synchronously to the shot transitions.

\* \* \* \* \*